United States Patent
Asai et al.

[11] Patent Number: 5,540,626
[45] Date of Patent: Jul. 30, 1996

[54] DAMPER PULLEY

[75] Inventors: Tomohito Asai; Masato Ueno; Kazutoshi Miyake; Satomi Watanabe; Takeshi Miyazaki; Nobuaki Funahashi, all of Aichi-Pre., Japan

[73] Assignee: Toyoda Gosei Co., Ltd., Japan

[21] Appl. No.: 387,428

[22] Filed: Feb. 10, 1995

[30] Foreign Application Priority Data

Mar. 18, 1994 [JP] Japan .................................. 6-074431

[51] Int. Cl.$^6$ .................................................... F16H 9/10
[52] U.S. Cl. ................................................ 474/94; 474/178
[58] Field of Search ............................ 474/94, 170, 174, 474/177, 178; 29/892

[56] References Cited

U.S. PATENT DOCUMENTS

| | | | |
|---|---|---|---|
| 3,101,214 | 8/1963 | Talboys | 474/94 X |
| 3,216,267 | 11/1965 | Dolza | 474/94 |
| 3,257,860 | 6/1966 | Runde et al. | 474/94 |
| 4,548,592 | 10/1985 | Ohhashi et al. | 474/177 X |
| 4,824,422 | 4/1989 | Jocic | 29/892 X |
| 5,409,423 | 4/1995 | Ullrich et al. | 474/170 |
| 5,441,456 | 8/1995 | Watanabe et al. | 474/94 |

FOREIGN PATENT DOCUMENTS

| | | | |
|---|---|---|---|
| 431242 | 6/1991 | European Pat. Off. | 474/94 |
| 63-37841 | 3/1988 | Japan . | |
| 5322419 | 12/1993 | Japan | 474/94 |

OTHER PUBLICATIONS

Abstract of Japanese Patent No. 58–88246, May 26, 1983 (1 page).
Abstract of Japanese Patent No. 58–152953, Sep. 10, 1983 (1 page).

Primary Examiner—Roger J. Schoeppel
Attorney, Agent, or Firm—Cushman Darby & Cushman, L.L.P.

[57] ABSTRACT

A lightweight damper pulley is provided which can be produced in a simple manner. The damper pulley includes a central portion, a belt retaining portion made of metal plate, and a ring-shaped rubber or elastic member placed therebetween. The central portion includes a cylindrical boss portion to be fixed onto a rotary shaft, a main portion extending radially outwardly from the larger diameter area of the cylindrical boss portion, and a flange bent horizontally from an outer periphery of the main portion. The central portion is integrally formed from a metal plate by press-forming or the like. The flange and the belt retaining portion can have projections which compress the rubber or elastic member to hold it securely in place.

24 Claims, 2 Drawing Sheets

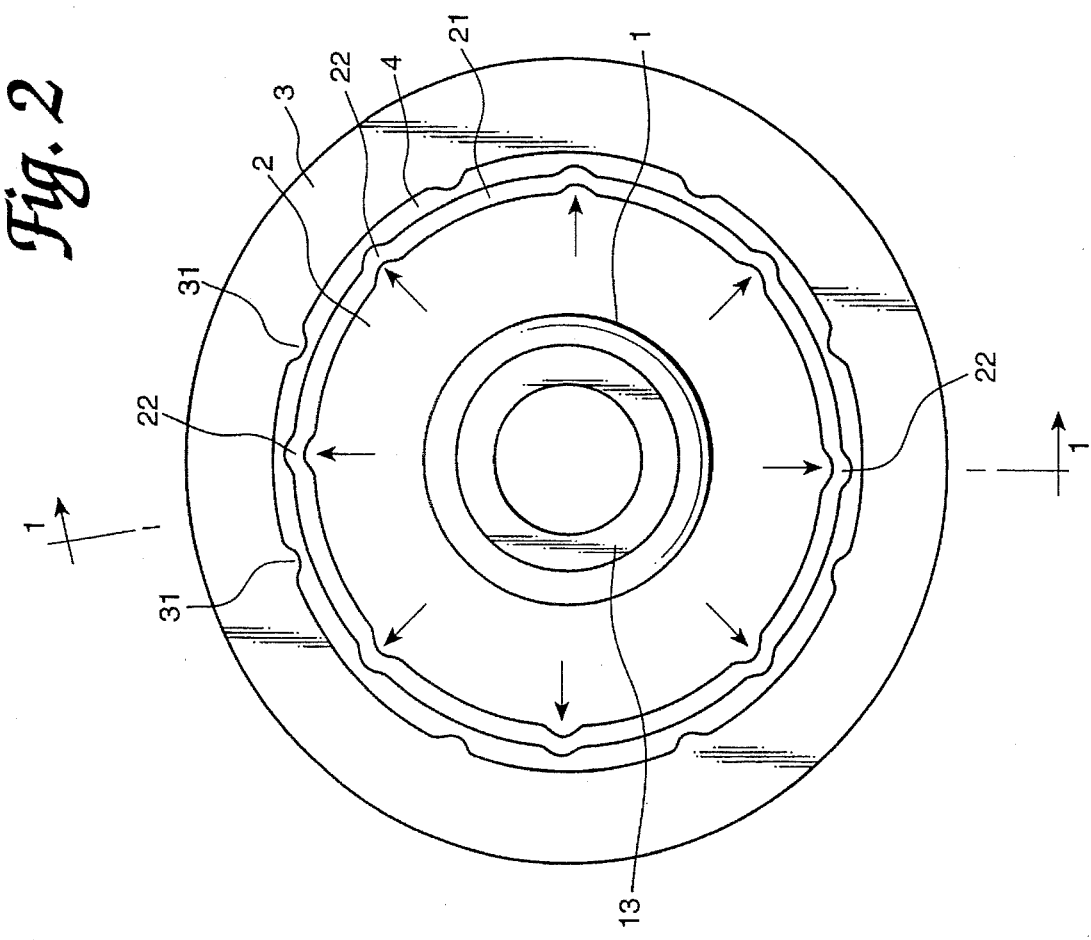
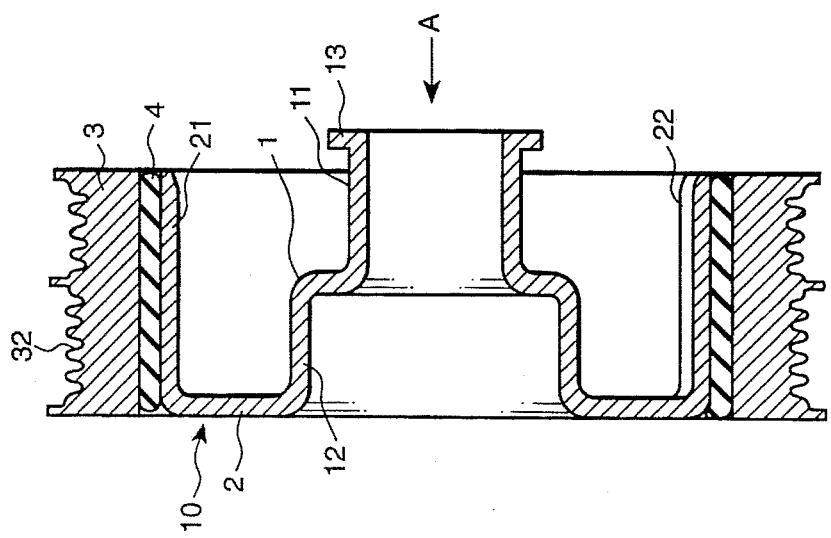

DAMPER PULLEY

BACKGROUND OF THE INVENTION

1. Field of the Invention

The present invention relates to a damper pulley, and more particularly to a damper pulley which is lightweight and can be produced in a simple manner.

2. Background and Description of Related Art

FIG. 5 illustrates a conventional damper pulley. As shown, the pulley includes a cylindrical boss portion 1, to be fixed onto a rotary shaft (not shown), and an annular main portion 2, which is positioned about the outer periphery of the cylindrical boss portion 1. Such pulleys were integrally formed by casting. A rubber or elastic member 4 is joined to the outer periphery of the main portion 2, and a ring-shaped belt retaining portion 3 is fit over the outer periphery of the rubber or elastic member.

A rotary driving-force from the rotary shaft is exerted from the belt retaining portion 3 to a belt 5 through the rubber or elastic member 4. When torsional vibrations are exerted from the rotary shaft, the belt retaining portion 3 resonates therewith, thereby absorbing or restraining the exerted torsional vibrations.

However, a damper pulley formed of cast metal has thick dimensions and, accordingly, has substantial weight. The conventional process also requires cure-bonding with adhesives of the rubber or elastic member 4, which increases production costs. In this case, if bonding is not used, the rubber or elastic member 4 slips in the rotary direction, and further, when it is very hard, the rotary force may not be exerted.

Japanese Utility Model application laid-open No. Sho 63-37841 discloses a damper pulley which has grooves in the outer peripheral surface of the main portion and the inner peripheral surface of the belt retaining portion, and a part of the rubber or elastic member is inserted so as to fill the grooves thereof in order to prevent slipping. However, it requires forming grooves and inserting the rubber or elastic member is difficult.

SUMMARY OF THE INVENTION

It is an object of the prevent invention to provide a lightweight damper pulley which can be produced in a simple manner.

It is another object of the present invention to provide a damper pulley at low cost which can prevent a rubber or elastic member from slipping.

A damper pulley in accordance with the present invention has a cylindrical boss portion, adapted to fit onto a rotary shaft, a main portion which extends radially outwardly therefrom, and a flange which extends horizontally backwards, at about a 90° angle, from the outer periphery of the main portion. The damper pulley also includes a ring-shaped belt retaining portion and a ring-shaped rubber or elastic member between the belt retaining portion and the flange.

Projecting portions are provided in the flange which project outwardly in the circumferential direction thereof in order to press the rubber or elastic member.

BRIEF DESCRIPTION OF THE DRAWING

FIG. 1 is a cross-sectional view of a damper pulley of the first embodiment in accordance with the present invention taken along lines 1—1 of FIG. 2;

FIG. 2 is a front view of a damper pulley from the direction of arrow A in FIG. 1;

DETAILED DESCRIPTION OF THE PREFERRED EMBODIMENTS

Figure 3:
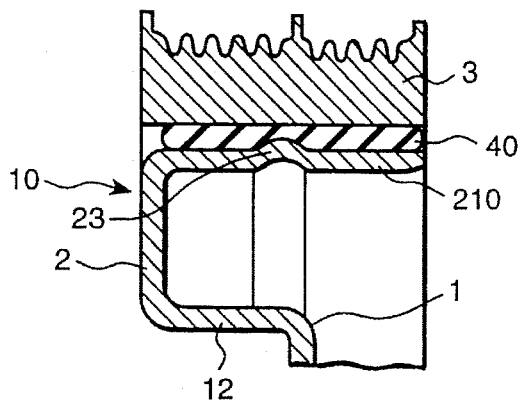
FIG. 3 is an enlarged partial cross-sectional view of a second embodiment in accordance with the present invention.

FIGS. 1 and 2 illustrate a first embodiment of the present invention, which will be described in detail hereinafter.

As shown in the drawings, the damper pulley is comprised of a central portion 10, a belt retaining portion 3 and a rubber or elastic member 4. The central portion 10 includes an axially extending cylindrical boss portion 1, a radially extending main portion 2, and a flange portion 21. Preferably, central portion 10 is integrally formed of a thin metal plate by press-forming or the like.

The boss portion 1 comprises a smaller diameter area 11 and a lager diameter area 12, as well as a reinforcing flange 13 about the outer periphery of the smaller diameter 11. The smaller diameter area 11 is fitted onto a rotary shaft (not shown). The flange 13 at the end of the smaller diameter area 11 can be formed by bending the end to create a bent portion that is substantially perpendicular to the plane surface thereof, so as to define a reinforcing flange 13 having a predetermined radius length.

The main portion 2 extends radially outwardly from the end of the lager diameter area 12. The flange 21, of a predetermined uniform length, bends horizontally from an outer periphery of the main portion 2 so that it extends axially in the direction of the axis of smaller diameter area 11.

The ring-shaped belt retaining portion 3 formed by casting, or the like, and is provided on outer periphery of the flange 21. A ring-shaped rubber or elastic member 4 of a uniform thickness is placed between the belt retaining portion 3 and the flange 21.

V-shaped grooves 32 are formed in the outer periphery of the belt retaining portion 3. Also included are a series of circumferentially spread apart projections 31, which extend axially and project toward the inside in the peripheral direction. Projections 31 are provided in the inner periphery of belt retaining portion 3.

The flange 21 is pushed outwardly so as to compress the rubber or elastic member 4 after inserting thereof, and projections 22, which project toward the outside in the peripheral direction, are provided in the flange 21 at the middle position between each projection 31. The projections 22 and 31, press forcefully the rubber or elastic member 4 so that it is compressed between the flange 21 and the belt retaining portion 3.

When driving-force is exerted from the rotary shaft 1, the damper pulley rotates, and the rubber or elastic member 4 tends to slip. However, because the rubber or elastic member 4 is pressed forcefully by the projections 22 and 31, alternately, from inside and outside, slipping and falling out of the rubber or elastic member 4 can be prevented.

According to this embodiment, the rubber or elastic member can be placed without cure-bonding using adhesive, and can be positioned in a simple way at low cost by enlarging the flange 21.

The projections 22 and 31 need not always be formed alternately in both the inner and outer periphery of the flange 21 and retaining portions, respectively. Rather, projections 22 and 31 may be provided in either of the flange 21 or the belt retaining portion 3.

Further, boss portion 1.may be formed of a separate metal tube member and welded or otherwise secured in place.

The belt retaining portion 3 may be formed by bending a plate member, and projections 31 may be provided by projecting the peripheral wall inwardly in the circumferential direction thereof. In this case, the rubber or elastic member may be compressed by constricting the belt retaining portion 3.

FIG. 3 illustrates a second embodiment of the present invention, where a flange 210 has a projecting portion 23 at the middle part in the width direction. The projecting portion 23 is formed by inserting a die having the desired projection at the same time of forming projections 22. A rubber or elastic member,40 is compressed by the projecting portion 23. Other portions are same as the first embodiment.

Figure 4:
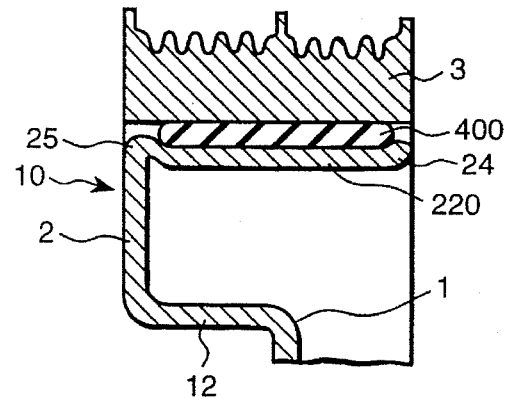
FIG. 4 is an enlarged partial cross-sectional view of a third embodiment in accordance with the present invention.
Figure 5:
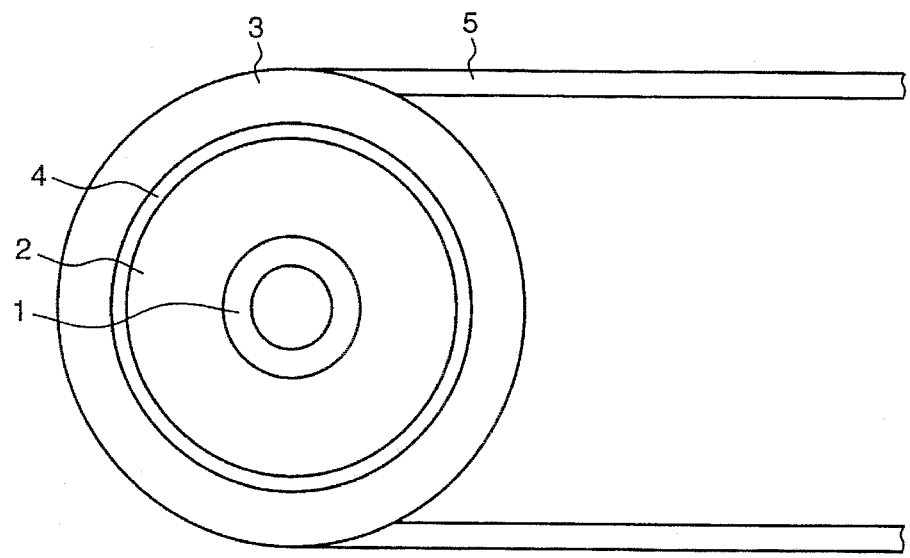
FIG. 5 is a front view of a conventional damper pulley.

FIG. 4 illustrates a third embodiment of the present invention, where both edges of a flange 220 are bent radially outwardly about the circumference thereof so as to define bent portions 24 and 25. The bent portion 25 is provided at the time of forming the central pulley portion 10 by press forming or the like. The bent portion 24 is provided by pushing with a die after inserting the rubber or elastic member 4. Both end portions of the rubber or elastic member 220 are restricted by the bent portions 24 and 25. Other portions are same as the first embodiment.

As described above, the damper pulley, provided in accordance with the present invention, can be produced in a simple manner because there is no need to execute cure-bonding with adhesives, as the rubber or elastic member is pressed to be positioned by protrusions which projects thereto. Besides, the projections are formed by projecting the main portion or the belt retaining portion made of metal-plate.

Further, the weight of the damper pulley can be significantly reduced since, at least, the main portion is formed from thin-metal plate.

Furthermore, the flange is enlarged, or the belt retaining portion is constricted at the time of forming projections so that the rubber or elastic member is positioned firmly, and since the difference of the space, between the flange and the belt retaining portion, and the width of the rubber or elastic member is small, inserting the rubber or elastic member to the space is easily done.

While the invention has been described in connection with what is presently considered to be the most practical and preferred embodiment, it is to be understood that the invention is not to be limited to the disclosed embodiment, but, on the contrary, is intended to cover various modification and equivalent arrangements included within the spirit and scope of the appended claims.

What is claimed is:

1. A damper pulley comprising:

a central portion having an axis and including a cylindrical boss portion arranged to be fixed onto a rotary shaft, a main portion extending radially outwardly from said boss portion and a flange extending axially from an outer periphery of said main portion, wherein said flange includes a radially extending projection at the middle thereof, a ring-shaped belt retaining portion provided at said outer periphery of said main portion, and a ring-shaped elastic member positioned between said belt retaining portion and said flange, said flange including a plurality of circumferentially radially extending areas that compress said elastic member.

2. A damper pulley according to claim 1, wherein an end of said boss portion is bent to be substantially perpendicular to the plane surface thereof so as to define a reinforcing flange thereabout.

3. A damper pulley according to claim 1, wherein said belt retaining portion is made of metal plate and wherein said belt retaining portion includes a plurality of inwardly directed circumferentially spaced projections constructed and arranged to compress said elastic member.

4. A damper pulley according to claim 3, wherein said belt retaining portion has grooves in the outer periphery thereof.

5. A damper pulley according to claim 1, wherein said flange includes interior and exterior edges with each said edge being bent outwardly in the circumferential direction thereof.

6. A damper pulley according to claim 1, wherein said belt retaining portion has grooves in the outer periphery thereof.

7. A damper pulley according to claim 1, wherein said radially extending areas also extend axially along said flange.

8. A damper pulley according to claim 1, wherein said ring-shaped belt retaining portion further includes a plurality of inwardly directed, circumferentially spaced apart projections constructed and arranged to compress said elastic member.

9. A damper pulley comprising:

a central portion having an axis and including a cylindrical boss portion arranged to be fixed onto a rotary shaft, a main portion extending radially outwardly from said boss portion and a flange extending axially from an outer periphery of said main portion, wherein said flange includes interior and exterior edges with each said edge being bent outwardly in the circumferential direction thereof;

a ring-shaped belt retaining portion provided at said outer periphery of said main portion, and a ring-shaped elastic member positioned between said belt retaining portion and said flange, said flange including a plurality of circumferentially radially extending areas that compress said elastic member.

10. A damper pulley according to claim 9, wherein an end of said boss portion is bent to be substantially perpendicular to the plane surface thereof so as to define a reinforcing flange thereabout.

11. A damper pulley according to claim 9, wherein said flange includes a radially extending projection at the middle thereof.

12. A damper pulley according to claim 9, wherein said belt retaining portion has grooves in the outer periphery thereof.

13. A damper pulley according to claim 9, wherein said radially extending areas also extend axially along said flange.

14. A damper pulley according to claim 9, wherein said ring-shaped belt retaining portion further includes a plurality of inwardly directed, circumferentially spaced apart projections constructed and arranged to compress said elastic member.

15. A damper pulley according to claim 9, wherein said belt retaining portion is made of metal plate and wherein said belt retaining portion includes a plurality of inwardly directed circumferentially spaced projections constructed and arranged to compress said elastic member.

16. A damper pulley according to claim 15, wherein said belt retaining portion has grooves in the outer periphery thereof.

17. A damper pulley comprising:

a central portion having an axis and including a cylindrical boss portion arranged to be fixed onto a rotary shaft, a main portion extending radially outwardly from said boss portion and a flange extending axially from an outer periphery of said main portion, a ring-shaped belt retaining portion provided at said outer periphery of said main portion, and a ring-shaped elastic member positioned between said belt retaining portion and said flange, said flange including a plurality of circumferentially radially extending areas that compress said elastic member, wherein said radially extending areas also extend axially along said flange.

18. A damper pulley according to claim 17, wherein an end of said boss portion is bent to be substantially perpendicular to the plane surface thereof so as to define a reinforcing flange thereabout.

19. A damper pulley according to claim 17, wherein said flange includes a radially extending projection at the middle thereof.

20. A damper pulley according to claim 17, wherein said flange includes interior and exterior edges with each said edge being bent outwardly in the circumferential direction thereof.

21. A damper pulley according to claim 17, wherein said belt retaining portion has grooves in the outer periphery thereof.

22. A damper pulley according to claim 17, wherein said ring-shaped retaining portion further includes a plurality of inwardly directed, circumferentially spaced apart projections constructed and arranged to compress said elastic member.

23. A damper pulley according to claim 17, wherein said belt retaining portion is made of metal plate and wherein said belt retaining portion includes a plurality of inwardly directed circumferentially spaced projections constructed and arranged to compress said elastic member.

24. A damper pulley according to claim 23, wherein said belt retaining portion has grooves in the outer periphery thereof.

* * * * *